3,043,839
SUBSTITUTED PHENOSELENAZINE COMPOUNDS
Paul N. Craig, Roslyn, Pa., assignor to Smith Kline & French Laboratories, Philadelphia, Pa., a corporation of Pennsylvania
No Drawing. Filed June 15, 1959, Ser. No. 820,105
10 Claims. (Cl. 260—241)

This invention relates to novel 10-substituted phenoselenazines and further relates to novel trifluoromethyl substituted phenoselenazines which are unsubstituted in the 10-position and which have utility as intermediates.

More specifically, the 10-substituted phenoselenazines of this invention have utility as antihistaminics, antispasmodics and antiemetics. These compounds are particularly useful as central nervous system depressants, for example, as tranquilizers or mild sedatives. In addition, these compounds have antimicrobial activity, for example, fungicidal and antibacterial activity. Further, these novel compounds have a surprisingly low degree of toxicity and a high level of chemical stability.

The 10-substituted phenoselenazines of this invention are represented by the following general formulae:

(Formula I)     (Formula II)

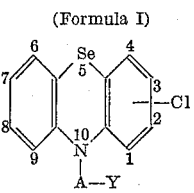 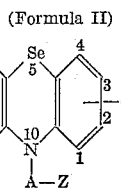

when:

A represents a divalent, straight or branched alkylene chain containing 2 to 6 carbon atoms;

Y represents N-hydrogenpiperazinyl, N-lower-alkyl-piperazinyl, N-(ω-hydroxy-lower-alkyl)-piperazinyl, N-(ω-hydroxy-lower-alkoxy-lower-alkyl)-piperazinyl, 2,5-dimethylpiperazinyl, N-acetylpiperazinyl or N-(ω-acetoxy-lower-alkyl)-piperazinyl; and Z represents amino, di-lower-alkylamino, pyrrolidinyl, morpholinyl, piperidinyl, thiomorpholinyl, N-hydrogenpiperazinyl, N-lower-alkylpiperazinyl, N-(ω-hydroxy-lower-alkyl)-piperazinyl, N-(ω-hydroxy-lower-alkoxy-lower-alkyl)-piperazinyl, 2,5-dimethylpiperazinyl, N-acetyl-piperazinyl or N-(ω-acetoxy-lower-alkyl)-piperazinyl.

Advantageous compounds of this invention are represented by the above structural formulae when:

Cl and $CF_3$ are in the 2-position;

A represents a divalent, straight or branched alkylene chain containing 2 to 4 carbon atoms;

Y represents N-hydrogenpiperazinyl, N-lower-alkyl-piperazinyl, N-(ω-hydroxy-lower-alkyl)-piperazinyl, N-(ω-hydroxy-lower-alkoxy-lower-alkyl)-piperazinyl, or N-(ω-acetoxy-lower-alkyl)-piperazinyl; and Z represents dimethylamino, N-hydrogenpiperazinyl, N-lower-alkylpiperazinyl, N-(ω-hydroxy-lower-alkyl)-piperazinyl, N-(ω-hydroxy-lower-alkoxy-lower-alkyl)-piperazinyl or N-(ω-acetoxy-lower-alkyl)-piperazinyl.

By the term lower alkyl where used herein, alkyl groups having not more than 4 carbon atoms and preferably not more than 2 carbon atoms are indicated. By the term lower alkoxy where used herein, divalent alkoxy groups having from 2 to 4 carbon atoms are indicated. The term dialkylamino is used to include 5- or 6-membered, monocyclic, heterocyclic amines attached to the alkylene chain A through a nitrogen atom.

The substituted phenoselenazines, which are unsubstituted in the 10-position in accordance with this invention, are used as intermediates to prepare pharmacologically active 10-substituted phenoselenazines described above. The substituted phenoselenazines including the novel trifluoromethyl phenoselenazines which are unsubstituted in the 10-position are represented by the following formula:

Formula III

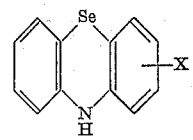

when X represents chlorine or trifluoromethyl, preferably in the 2-position.

The phenoselenazines of Formula III are prepared by heating X-substituted diphenyl amines with selenium or preferably selenium monochloride for long periods of time. The selenium chloride may be used in either equivalent amounts or, preferably, in excess. The reaction is run in a melt of the diphenyl amine under an inert gas, such as nitrogen for long periods of time, for instance, for from one to four weeks. A preferred method which gives better yields is to react the reagents in a suitable organic solvent, preferably an aromatic solvent, for instance xylene, benzene, toluene or chlorobenzene by refluxing until hydrogen chloride ceases to be evolved, usually from one to four weeks. The desired phenoselenazine is then isolated by distillation. It may be purified by fractional recrystallization, for instance from a benzene-hexane mixture.

The selected phenoselenazine nucleus of Formula III when X is chlorine or trifluoromethyl may be condensed with a reactive tertiary aminoalkyl ester having the desired dialkylaminoalkyl group to form the desired 10-substituted phenoselenazine of Formulae I or II. Any reactive tertiary aminoalkyl ester containing the desired aminoalkyl group may be used, such as the halides, preferably bromide or chloride, or the sulfonic or sulfuric esters, preferably p-toluene sulfonate. The reaction is preferably carried out at a temperature in the range of from about 30° C. to about 160° C. The condensation is carried out advantageously by refluxing the reactants in an inert aromatic solvent, such as benzene, xylene or toluene, in which at least one of the reactants must be soluble. A suitable acid-binding agent may be included, such as an alkali metal amide, preferably sodium amide or potassium amide; an alkali metal hydroxide, preferably potassium hydroxide; an alkali metal hydride, preferably sodium hydride; or alkali metal aryl or alkyl compounds, preferably phenyl sodium or octyl sodium.

If an acid addition salt of the reaction dialkylaminoalkyl ester is used, a corresponding increase in the amount of acid-binding agent must also be used.

The preferred method of alkylation, however, is to react the substituted phenoselenazine nucleus with a dialkylaminoalkyl chloride or bromide with a slight excess of sodium or potassium amide in refluxing benzene or toluene for from 30 minutes to 36 hours, preferably 3 to 8 hours.

The preferred method of isolating the 10-alkylated phenoselenazine is to quench the cooled reaction mixture with an excess of water. The organic layer is separated and extracted with dilute acid, preferably dilute hydrochloric acid. Any unreacted phenoselenazine starting material is recovered from the organic layer. The acid extracts are combined, neutralized with base and re-extracted into an organic solvent, for instance ethyl acetate, benzene or chloroform. The desired base is isolated either by evaporating the solvent and distilling the residue under high vacuum or by forming a stable salt and purifying the salt by fractional crystallization.

The 10-(aminoalkyl)-substituted phenoselenazines are alternatively prepared by methods which involve chemical modifications of an alkyl chain which has a reactive, terminal group such as a halogen, a carboxy, tosylate, aldehydo or cyano group and which chain is attached to the 10-position of the parent substituted phenoselenazine. While such methods are conveniently used to prepare 10-(tertiaryaminoalkyl)-phenoselenazines, they are particularly valuable for the preparation of the 10-(ω-primary and secondary aminoalkyl)-phenoselenazine derivatives of the series.

This invention also includes salts of the above 10-substituted phenoselenazine bases of Formulae I and II formed with nontoxic organic and inorganic acids. Such salts are easily prepared by methods known to the art. The base is reacted with either the calculated amount of organic or inorganic acid in a water-miscible solvent, such as acetone or ethanol, with isolation of the salt by concentration and cooling; or with an excess of the acid in a water-immiscible solvent, such as ethyl acetate, ethyl ether or chloroform with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, glutamic, benzenesulfonic and theophylline acetic acids as well as with the 8-halotheophyllines, for example, 8-chlorotheophylline and 8-bromotheophylline. Exemplary of such inorganic salts are those with hydrobromic, hydrochloric, sulfuric, sulfamic, phosphoric and nitric acids. Of course, these salts may also be prepared by the classical method of double decomposition of appropriate salts which is well-known to the art.

The following examples are illustrative of the compounds of this invention and their preparation.

*Example 1*

A suspension of 70 g. of selenium monochloride and 200 g. of 3-chlorodiphenylamine in 500 ml. of dry benzene is heated at reflux with good ventilation until the evolution of hydrogen chloride gas ceases, about 13 days. The reaction mixture is evaporated at the water pump and the residue vacuum distilled. After recovering a forerun of unchanged 3-chlorodiphenylamine, the product, 2-chlorophenoselenazine, is recovered by distillation at 260° C. at 5 mm. as a thick oil which crystallizes upon standing, M.P. 188–190° C. The solid 2-chlorophenoselenazine is recrystallized several times from hexane and hexane-benzene to crystals with a melting point of 195–196° C.

A suspension of 5.6 g. of 2-chlorophenoselenazine, 3.9 g. of 3-chloro-2-methyl-1-(N-methylpiperazinyl)-propane and 0.9 g. of sodium amide in 150 ml. of benzene under a nitrogen atmosphere is heated at reflux for seven hours. About 100 ml. of water is added carefully. The washed benzene layer is extracted with several portions of dilute hydrochloric acid. Neutralization with sodium hydroxide solution, followed by extraction with several portions of benzene, gives a solution of the desired product. Evaporation of the dried benzene extracts and distillation of the residue gives a high-boiling oil, 2-chloro-10-[2'-methyl-3'-(N-methylpiperazinyl)-propyl]-phenoselenazine, B.P. 231 to 237° C. at 0.1 mm.

A solution of 1.0 g. of the crystallized base in 75 ml. of ethanol is mixed with 0.5 g. of citric acid in 25 ml. of ethanol. The solution is heated and allowed to concentrate on the steam bath. Cooling and adding ether separates the citrate salt.

*Example 2*

A suspension of 25 g. of selenium chloride and 80 g. of 3-trifluoromethyldiphenylamine in 400 ml. of dry xylene is heated at reflux under nitrogen for three weeks. The reaction mixture is evaporated at the water pump at 50° C. The residue is distilled to give a pale, high-boiling liquid, 2-trifluoromethylphenoselenazine, which solidifies.

A suspension of 19 g. of 10-(2'-cyanoethyl)-2-trifluoromethylphenoselenazine (prepared by reacting 64 g. of 2-trifluoromethylphenoselenazine with 300 ml. of acrylonitrile with 1 ml. of benzyltrimethylammonium hydroxide) in 500 ml. of dry ether is stirred while a solution of 8.0 g. of lithium aluminum hydride in 250 ml. of ether is slowly added. The reaction mixture is heated at reflux under nitrogen for several hours. Methanol is added to destroy the aluminum complex. The filtered reaction mixture is evaporated and the residue taken into several portions of dilute hydrochloric acid. The acid extracts are neutralized with sodium hydroxide solution and extracted with 500 ml. of dry ether. Evaporation of the ether gives a crude residue of 10-(3'-aminopropyl)-2-trifluoromethylphenoselenazine.

*Example 3*

A suspension of 83 g. of 10-(3'-chloropropyl)-2-trifluoromethyl phenoselenazine (prepared from reacting 49 g. of 1-bromo-3-chloropropane and 57 g. of 2-trifluoromethylphenoselenazine with 17 g. of sodamide in 750 ml. of benzene), 75 g. of anhydrous piperazine and 100 ml. of methanol is heated at reflux for six hours. The solution is then diluted with 400 ml. of chloroform-water mixture. The chloroform layers are separated, washed with water and extracted with 10% hydrochloric acid. The acid extracts are filtered through sintered glass and neutralized with sodium hydroxide solution. The separated organic material is taken up in benzene. The benzene extracts are dried and evaporated to yield crude 10-(3'-piperazinylpropyl)-2-trifluoromethylphenoselenazine.

*Example 4*

A suspension of 4.7 g. of 10-(3'-piperazinylpropyl)-2-trifluoromethylphenoselenazine prepared as in Example 3, 2.0 g. of β-bromoethyl acetate and 4.0 g. of potassium carbonate in 75 ml. of xylene is heated at reflux with stirring and under nitrogen for ten hours. The reaction mixture is filtered. The filtrate is washed with water, dried and concentrated. The residue is weighed, taken up in ethyl acetate and treated with an excess of maleic acid to give crude 10-[3'-(N-acetoxyethylpiperazinyl)-propyl]-2-trifluoromethylphenoselenazine dimaleate.

*Example 5*

A suspension of 4.7 g. of 10-(3'-piperazinylpropyl)-2-trifluoromethylphenoselenazine prepared as in Example 3, 1.5 g. of β-bromoethanol and 2.0 g. of potassium carbonate in 50 ml. of toluene is heated at reflux under nitrogen for six hours. The mixture is treated with water. The organic layer is treated with dilute acid, made basic, and re-extracted. Distillation of the residue in a mocromolecular still gave a high boiling liquid which is taken up in ethanol, treated with an excess of mandelic acid to give crystals of 10-[3'-(N-β-hydroxyethylpiperazinyl)-propyl]-2-trifluoromethylphenoselenazine dimandelate.

*Example 6*

A suspension of 4.7 g. of 10-(3'-piperazinylpropyl)-2-trifluoromethylphenoselenazine prepared as in Example 3, 2.0 g. of 2-bromo-2'-hydroxyethyl ether and 2.0 g. of potassium carbonate in 75 ml. of toluene is reacted following the procedure of Example 5 to give 10-[3'-(N-β-hydroxyethoxyethylpiperazinyl) - propyl]-2-trifluoromethylphenoselenazine dimandelate.

*Example 7*

A suspension of 10.5 g. of 2-trifluoromethylphenoselenazine, and 1.7 g. of potassium amide in 300 ml. of benzene is heated at reflux for 30 minutes, after which 2-bromo-1-diethylaminoethane (4.8 g.) is added and the reflux period is extended for six hours. After working up as in Example 1, a yellow liquid, 10-(2'-diethylaminoethyl)-2-trifluoromethylphenoselenazine, is obtained at B.P. 165 to 170° C. at 0.3 mm.

A solution of 2.1 g. of this base in 25 ml. of ethanol is warmed on the steam bath and 0.8 g. of tartaric acid added. Concentration and dilution with ether separates the tartrate salt.

Repeating this reaction with 6.2 g. of 2-trifluoromethylphenoselenazine, 2.6 g. of 3-chloro-1-dimethylaminopropane and 0.9 g. of sodium amide in 100 ml. of refluxing toluene for three hours gives the viscous base, 10-(3'-dimethylaminopropyl) - 2-trifluoromethylphenoselenazine, boiling at 170 to 175° C. at 0.1 mm.

Example 8

A suspension of 6.3 g. of 2-trifluoromethylphenoselenazine, 3.8 g. of 5-bromo-1-dimethylaminopentane and 0.9 g. of sodium amide in 200 ml. of xylene is heated at reflux under nitrogen for 30 hours. After working up as in Example 1, 10 - (5'-dimethylaminopentyl)-2-trifluoromethylphenoselenazine is obtained.

Example 9

A suspension of 15.7 g. of 2-trifluoromethylphenoselenazine, 7.4 g. of 3-chloro-1-N-(pyrrolidinyl)-propane and 2.0 g. of sodium amide in 250 ml. of toluene is heated at reflux for six hours. After working up as in Example 1, a yellow, viscous oil, 10-(3'-N-pyrrolidinylpropyl)-2-trifluoromethylphenoselenazine, is obtained.

A solution of 5.0 g. of the base in 50 ml. of ethanol is mixed with 1.5 g. of salicyclic acid in 10 ml. of ethanol with heat on the steam bath. The solution is allowed to evaporate and then cooled to give crystals of 10-(3'-N-pyrrolidinylpropyl) - 2 - trifluoromethylphenoselenazine salicylate.

Example 10

A suspension of 16 g. of crude 2-chloro-10-(2'-chloroethyl)-phenoselenazine (prepared by reacting 28.5 g. of 2-chlorophenoselenazine, 15 g. of 1-bromo-2-chloroethane and 5 g. of sodamide in 500 ml. of toluene) and 25 g. of piperazine in 75 ml. of methanol is reacted and worked up as in Example 3 to give 2-chloro-10-(2'-N-piperazinylethyl)-phenoselenazine.

A solution of 4.4 g. of 10-[2'-(N-acetylpiperazinyl)-ethyl]-2-chlorophenoselenazine [prepared by acylating 2-chloro - 10-(2'-N-piperazinylethyl)-phenoselenazine (6.0 g.) with acetyl chloride in pyridine solution] in 50 ml. of tetrahydrofuran is added slowly to 75 ml. of saturated lithium aluminum hydride-ether solution. The mixture is heated at reflux wtih stirring for ten hours. After careful decompositon of the aluminum complexes with methanol, the reaction mixture is worked up following the procedure of Example 2 to give 2-chloro-10-[2'-(N-ethylpiperazinyl)-ethyl]-phenoselenazine as a viscous oil.

Example 11

A suspension of 7.0 g. of 2-chloro-10-(2'-N-piperazinylethyl)-phenoselenazine prepared as in Example 10, 7.0 g. of n-butyl p-toluene sulphonate and 1.7 g. of anhydrous sodium carbonate in 50 ml. of ethanol is heated at reflux for seven hours under nitrogen. The mixture is treated with sodium hydroxide solution and benzene. The benzene extracts are combined and extracted with dilute hydrochloric acid. The acid extracts are neutralized. The separated organic material is taken into a large volume of ether, dried and treated with dry hydrogen bromide gas to separate solid 10-[2'-(N-butylpiperazinyl)-ethyl]-2-chlorophenoselenazine dihydrobromide.

The base is regenerated from this hydrobromide by shaking with ethyl acetate-sodium carbonate mixture. The ethyl acetate layer is dried and reacted with an excess of maleic acid to separate the stable dimaleate salt.

Example 12

A suspension of 3.2 g. of 2-trifluoromethylphenoselenazine, 2.0 g. of 3-chloro-2,2-dimethyl-1-(N-piperidino)-propane and 0.5 g. of sodium amide in 50 ml. of benzene is heated at reflux for four hours. After working up as in Example 1, the free base, 10-[2'-2'-dimethyl-3'-(N-piperidyl) - propyl]-2-trifluoromethylphenoselenazine, is obtained by distillation at 200 to 205° C. at 0.3 mm.

Example 13

A suspension of 6.3 g. of 2-trifluoromethylphenoselenazine, 3.2 g. of 2-chloro-1-(N-morpholinyl)-propane and 1.0 g. of sodium amide in 150 ml. of benzene is heated at reflux for seven hours. After working up the reaction mixture as in Example 1, the maleate salt of 10-[2'-(N - morpholinyl)-propyl]-2-trifluoromethylphenoselenazine is obtained.

Example 14

A suspension of 6.3 g. of 2-trifluoromethylphenoselenazine, 3.2 g. of 3-chloro-1-(N-thiomorpholinyl)-propane and 0.9 g. of sodium amide in 200 ml. of toluene is reacted and worked up following Example 1 to yield the oily free base, 10-(3'-N-thiomorpholinylpropyl)-2-trifluoromethylphenoselenazine.

Example 15

A suspension of 1.6 g. of 2-trifluoromethylphenoselenazine, 0.9 g. of 3-chloro-1-(N-methylpiperazinyl)-propane and 0.3 g. of sodium amide in 25 ml. of benzene is heated at reflux for eight hours. The reaction mixture is taken through an acid extraction as previously described. The ethyl acetate extract is treated with an excess of mandelic acid to give the dimandelate salt of 10 - [3' - (N - methylpiperazinyl) - propyl] - 2 - trifluoromethylphenoselenazine.

Example 16

2 - trifluoromethylphenoselenazine (6.4 g.) is reacted with 2-chloro-1-(N-ethylpiperazinyl)-ethane (4.0 g.) and sodium amide (1.0 g.) in 200 ml. of benzene as in Example 1 to give 10-[2'-(N-ethylpiperazinyl)-ethyl]-2-trifluoromethylphenoselenazine.

Example 17

A solution of 10.0 g. of 2-chloro-10-(3'-hydroxypropyl)-phenoselenazine p-toluenesulphonate (prepared by reacting 30.5 g. of the sodio derivative of 2-chlorophenoselenazine by condensation with 23.0 g. of γ-bromopropyl tetrahydropyranyl ether in 500 cc. of toluene, removing the protective pyranyl group by refluxing in hydrochloric acid and acylating the crude γ-hydroxy compound with an excess of p-toluenesulphonyl chloride in an excess of pyridine) and an excess of 2,5-dimethylpiperazine in 50 ml. of methanol is heated at reflux for ten hours. The volatile components are evaporated on the steam bath. The residue is extracted by shaking with a water-chloroform mixture. The washed organic layer is separated and extracted with dilute hydrochloric acid. The acid extracts are neutralized with sodium carbonate solution and re-extracted into ethyl acetate. A portion of the dried ethyl acetate solution is reacted with maleic acid to precipitate the maleate salt of 2-chloro-10 - [3' - (N - 2,5 - dimethylpiperazinyl) - propyl] - phenoselenazine.

Following this procedure, using an excess of piperazine in an open system as above, 2-chloro-10-(3'-N-piperazinylpropyl)-phenoselenazine is obtained.

Example 18

A suspension of 4.2 g. of 2-chloro-10-(3'-N-piperazinylpropyl)-phenoselenazine (prepared as in Example 17), 2.0 g. of β-bromoethylacetate and 2.0 g. of potassium carbonate in 75 ml. of toluene is heated at reflux with stirring for 12 hours. The reaction mixture is washed with water, then the organic layer separated, and taken through an acid extraction to give a resdue of crude base. Chromatographic purification through alumina isolates the desired compound. This oily material is weighed, taken up in ethyl acetate and reacted with 2 moles of maleic acid. Concentration and cooling gives crystals of 10 - [3' - (N - acetoxyethylpiperazinyl) - propyl] - 2-chlorophenoselenazine dimaleate.

2 - chloro - 10 - (3' - N - piperazinylpropyl) - phenoselenazine (2.1 g.) is alkylated in a formaldehyde-formic acid mixture to give 2-chloro-10-[3'-(N-methylpiperazinyl)-propyl]-phenoselenazine. The acetoxy compound prepared above (500 mg.) is heated in 10 ml. of N-hydrochloric acid. Neutralization and extraction with ethyl acetate gives a small amount of oily base, 2-chloro-10 - [3' - (N - hydroxyethylpiperazinyl) - propyl] - phenoselenazine.

*Example 19*

A suspension of 2.1 g. of 2-trifluoromethylphenoselenazine, 0.4 g. of potassium amide and 5.3 g. of 3-bromo-1-dimethylamino-2-methylpropane in 75 ml. of benzene is heated at reflux for six hours. Following the procedure of Example 11, 10-(3'-dimethylamino-2'-methylpropyl)-2-trifluoromethylphenoselenazine maleate is obtained. The oily base boils at 200 to 205° C. at 0.4 mm.

*Example 20*

A suspension of 3.2 g. of 2-trifluoromethylphenoselenazine, 0.5 g. of sodium amide and 2.0 g. of 3-chloro-2-methyl-1-(N-methylpiperazinyl)-propane in 100 ml. of benzene is heated at reflux for six hours. After working up the reaction mixture as in Example 1, an oily viscous base is obtained by micromolecular distillation at 185° C. at 2 microns, 10-[2'-methyl-3'-(N-methylpiperazinyl)-propyl]-2-trifluoromethylphenoselenazine.

*Example 21*

A suspension of 4.2 g. of 2-chloro-10-(3'-N-piperazinylpropyl)-phenoselenazine (prepared as in Example 17), 2.0 g. of 2-bromo-2'-hydroxyethyl ether and 2.0 g. of potassium carbonate in 100 ml. of toluene is reacted following the procedure of Example 5 to give 2-chloro-10-[3' - (N - β - hydroxyethoxyethylpiperazinyl) - propyl]-phenoselenazine dimandelate.

*Example 22*

Following the procedure outlined in Example 17, 10.0 g. of 10-(3'-hydroxypropyl)-2-trifluoromethylphenoselenazine p-toluenesulfonate is reacted with an excess of 2,5-dimethylpiperazine to yield the maleate salt of 10-[3'-(N - 2,5 - dimethylpiperazinyl) - propyl] - 2 - trifluoromethylphenoselenazine.

*Example 23*

A solution of 6.0 g. of 10-[3'-(N-acetylpiperazinyl)-propyl]-2-trifluoromethylphenoselenazine (prepared by acetylating 7.0 g. of 10-(3'-N-piperazinylpropyl)-2-trifluoromethylphenoselenazine with acetyl chloride in pyridine solution) in 50 ml. of tetrahydrofuran is added slowly to 75 ml. of saturated lithium aluminum hydride-ether solution. The mixture is stirred and refluxed for ten hours. Working up as described in Example 10 yields 10 - [3' - (N - ethylpiperazinyl) - propyl] - 2 - trifluoromethylphenoselenazine.

It is not desired to be limited except as set forth in the following claims.

This application is a continuation-in-part of application Serial No. 639,861, filed February 13, 1957, now abandoned.

What is claimed is:

1. A chemical compound of the class consisting of a free base and its nontoxic acid addition salts, said free base being selected from the group consisting of compounds of the formulae:

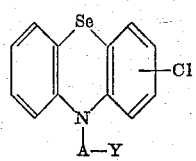

and

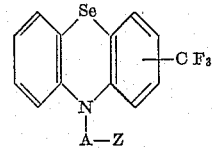

in which A is a divalent alkylene chain containing 2 to 6 carbon atoms; Y is a member selected from the group consisting of N-hydrogenpiperazinyl, N-lower-alkylpiperazinyl, N - (ω-hydroxy-lower-alkyl)-piperazinyl, N - (ω-hydroxy-lower-alkoxy-lower-alkyl)-piperazinyl, 2,5-dimethylpiperazinyl, N-acetylpiperazinyl and N-(ω-acetoxy-lower-alkyl)-piperazinyl; and Z is a member selected from the group consisting of amino, di-lower-alkylamino, pyrrolidinyl, morpholinyl, piperidinyl, thiomorpholinyl, N-hydrogenpiperazinyl, N-lower-alkylpiperazinyl, N-(ω-hydroxy-lower-alkyl)-piperazinyl, N-(ω-hydroxy - lower - alkoxy - lower - alkyl)-piperazinyl, 2,5-dimethylpiperazinyl, N-acetylpiperazinyl and N-(ω-acetoxy-lower-alkyl)-piperazinyl; each of the aforesaid lower alkyl moieties having 1 to 4 carbon atoms; and each of the aforesaid lower alkoxy moieties having 2 to 4 carbon atoms.

2. A chemical compound of the basic structural formula:

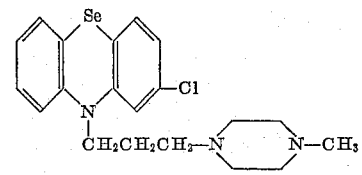

3. A chemical compound of the basic structural formula:

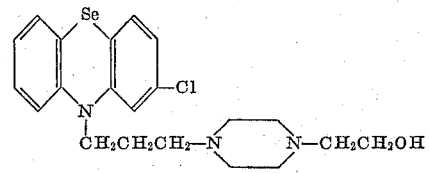

4. A chemical compound of the basic structural formula:

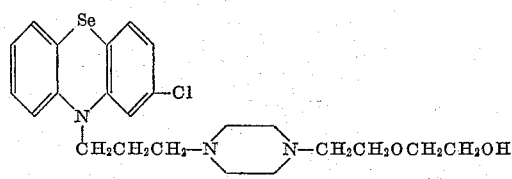

5. A chemical compound of the basic structural formula:

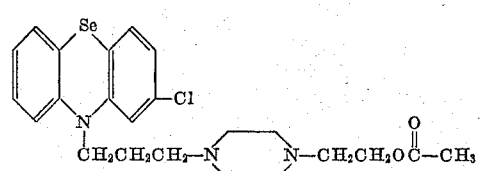

6. A chemical compound of the basic structural formula:

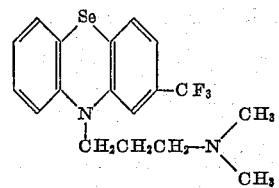

7. A chemical compound of the basic structural formula:

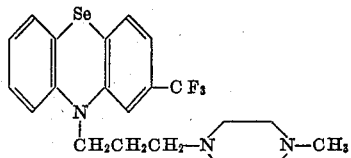

8. A chemical compound of the basic structural formula:

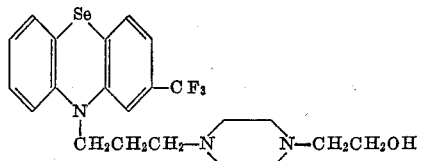

9. A chemical compound of the basic structural formula:

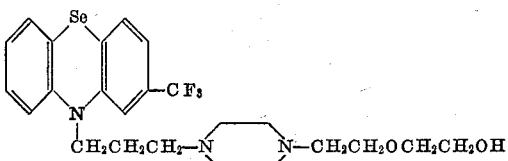

10. A chemical compound of the basic structural formula:

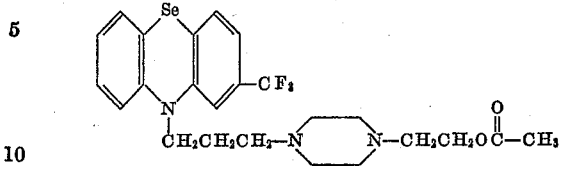

References Cited in the file of this patent

UNITED STATES PATENTS

| | | |
|---|---|---|
| 2,609,343 | Saunders et al. | Sept. 2, 1952 |
| 2,789,978 | Rath | Apr. 23, 1957 |
| 2,887,481 | Sherlock et al. | May 19, 1959 |
| 2,921,069 | Ullyot | Jan. 12, 1960 |

FOREIGN PATENTS

| | | |
|---|---|---|
| 814,065 | Great Britain | May 27, 1959 |

OTHER REFERENCES

Cornelius: J. Prakt. Chem., vol. 88 (Series 2), 1913, pp. 396–408.

Craig et al.: Australian J. Chem., vol. 8, page 252 (1955).